(12) United States Patent
Achten et al.

(10) Patent No.: US 12,168,319 B2
(45) Date of Patent: Dec. 17, 2024

(54) METHOD FOR APPLYING A MATERIAL CONTAINING A MELTABLE POLYMER, MORE PARTICULARLY A HOT-MELT ADHESIVE, ABOVE THE DECOMPOSITION TEMPERATURE THEREOF

(71) Applicant: Covestro Intellectual Property GmbH & Co. KG, Leverkusen (DE)

(72) Inventors: Dirk Achten, Leverkusen (DE); Thomas Buesgen, Leverkusen (DE); Joerg Tillack, Solingen (DE); Peter Reichert, Dormagen (DE); Nicolas Degiorgio, Krefeld (DE); Martin Melchiors, Leichlingen (DE); Wolfgang Arndt, Dormagen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 763 days.

(21) Appl. No.: 16/965,717

(22) PCT Filed: Feb. 13, 2019

(86) PCT No.: PCT/EP2019/053573
§ 371 (c)(1),
(2) Date: Jul. 29, 2020

(87) PCT Pub. No.: WO2019/158599
PCT Pub. Date: Aug. 22, 2019

(65) Prior Publication Data
US 2021/0031435 A1 Feb. 4, 2021

(30) Foreign Application Priority Data
Feb. 16, 2018 (EP) .................................. 18157167

(51) Int. Cl.
*B29C 64/118* (2017.01)
*B33Y 10/00* (2015.01)
(Continued)

(52) U.S. Cl.
CPC ............ *B29C 64/118* (2017.08); *B33Y 10/00* (2014.12); *C08G 18/3221* (2013.01); *C09J 175/06* (2013.01); *C08G 2170/20* (2013.01)

(58) Field of Classification Search
CPC ....... B29C 64/118; B33Y 10/00; B33Y 70/00; C08G 18/3221; C08G 2170/20; C09J 175/06
See application file for complete search history.

(56) References Cited

U.S. PATENT DOCUMENTS

| | | | |
|---|---|---|---|
| 4,946,535 A | 8/1990 | Meckel et al. | |
| 5,121,329 A | 6/1992 | Crump | |

(Continued)

FOREIGN PATENT DOCUMENTS

| | | |
|---|---|---|
| CN | 106796392 A | 5/2017 |
| WO | WO 2015109141 A1 | 7/2015 |
| WO | WO 2015120429 A1 | 8/2015 |

OTHER PUBLICATIONS

International Search Report, PCT/EP2019/053573, date of mailing: Apr. 24, 2019, Authorized officer: Luis Martins Lopes.

*Primary Examiner* — Nahida Sultana
*Assistant Examiner* — Jamel M Nelson
(74) *Attorney, Agent, or Firm* — The Webb Law Firm

(57) ABSTRACT

The invention relates to a method for applying a material containing a meltable polymer comprising the step of applying a filament of the at least partially molten material from a discharge opening of a discharge element onto a substrate. The meltable polymer has the following properties: —a (Continued)

melting point (DSC, differential scanning calorimetry; second heating with a heating rate of 5° C./min) in a range from ≥40° C. to ≤120° C.; —a glass transition temperature (DMA, dynamic mechanical analysis in accordance with DIN EN ISO 6721-1:2011) in a range from ≥−70° C. to ≤30° C.; —a storage modulus G' (parallel plate oscillation viscometer in accordance with ISO 6721-10:2015 at a frequency of 1/s) at 20° C. above the melting point of $\geq 1\cdot 10^4$ Pa; —a storage modulus G' (parallel plate oscillation viscometer in accordance with ISO 6721-10:2015 at a frequency of 1/s) at 10° C. below the melting point with prior heating to a temperature of 20° C. above the melting point and subsequent cooling with a cooling rate of 1° C./min of $\leq 1\cdot 10^7$ Pa; wherein the filament has an application temperature of ≥100° C. above the melting point of the meltable polymer for ≤5 minutes during the application process and wherein the meltable polymer further has the property that the storage modulus G' (parallel plate oscillation viscometer in accordance with ISO 6721-10:2015 at a frequency of 1/s) of the meltable polymer at the highest application temperature reached during the application process is smaller by a factor of ≥10 than the storage modulus G' (parallel plate oscillation viscometer in accordance with ISO 6721-10:2015 at a frequency of 1/s) at a temperature of 20° C. above the melting point of the meltable polymer.

15 Claims, 1 Drawing Sheet

(51) Int. Cl.
*C08G 18/32* (2006.01)
*C09J 175/06* (2006.01)

(56) References Cited

U.S. PATENT DOCUMENTS

| | | |
|---|---|---|
| 11,117,312 B2 | 9/2021 | Nakai et al. |
| 2016/0333152 A1* | 11/2016 | Cook ............... C08L 75/06 |
| 2017/0129177 A1 | 5/2017 | Hättig et al. |
| 2018/0044523 A1 | 2/2018 | Rodgers et al. |
| 2018/0094171 A1 | 4/2018 | Briers et al. |
| 2018/0319078 A1 | 11/2018 | Ederer et al. |

* cited by examiner

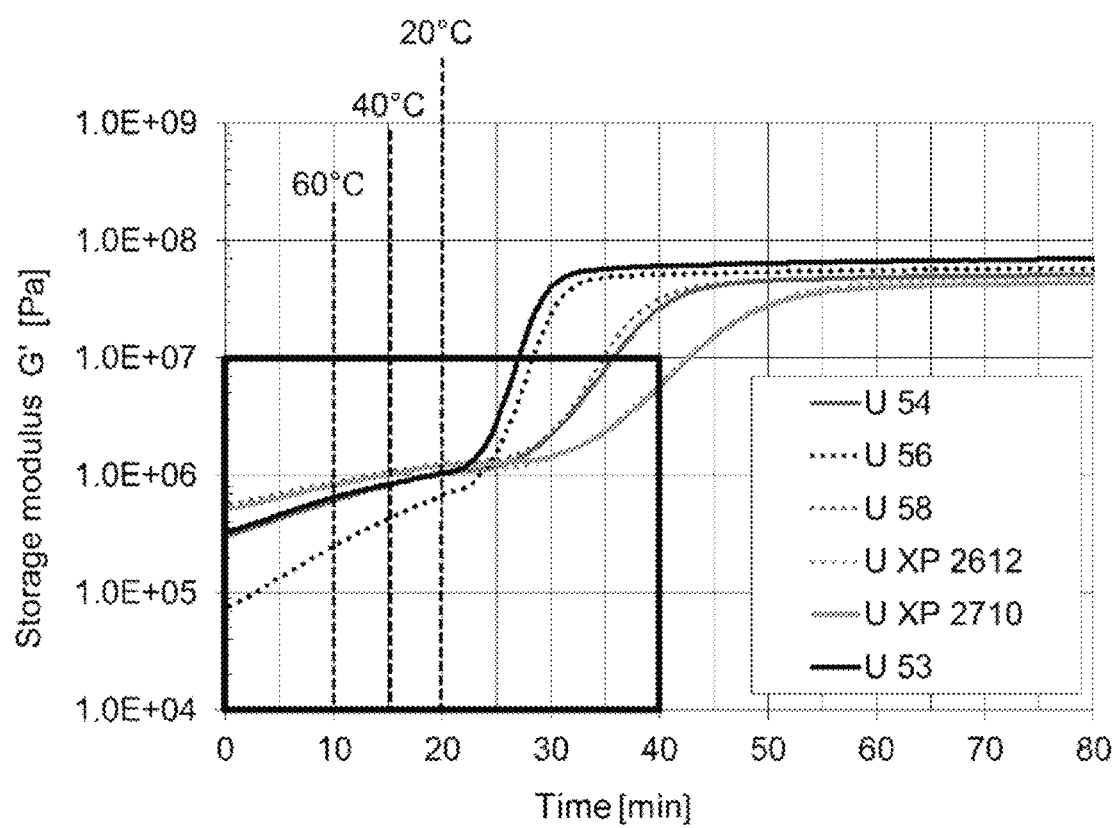

METHOD FOR APPLYING A MATERIAL CONTAINING A MELTABLE POLYMER, MORE PARTICULARLY A HOT-MELT ADHESIVE, ABOVE THE DECOMPOSITION TEMPERATURE THEREOF

CROSS-REFERENCE TO RELATED APPLICATION

This application is a national stage application under 35 U.S.C. § 371 of PCT/EP2019/053573, filed Feb. 13, 2019, which claims the benefit of European Application No. 18157167, filed Feb. 16, 2018, each of which is incorporated herein by reference.

FIELD

The present invention relates to a method of applying a material comprising a fusible polymer, comprising the step of applying a filament of the at least partly molten material from a discharge opening of a nozzle to a substrate.

BACKGROUND

Additive manufacturing methods refer to those methods by which articles are built up layer by layer. They therefore differ markedly from other methods of producing articles such as milling or drilling. In the latter methods, an article is processed such that it takes on its final geometry via removal of material.

Additive manufacturing methods use different materials and processing techniques to build up articles layer by layer. In fused deposition modeling (FDM) processes, for example, a thermoplastic wire is liquefied and deposited onto a movable construction platform layer by layer with the aid of a nozzle. Solidification gives rise to a solid article. The nozzle and build platform are controlled on the basis of a CAD drawing of the article. An early patent document for this technology is U.S. Pat. No. 5,121,329. If the geometry of this article is complex, for example with geometric undercuts, support materials additionally have to be printed and removed again after completion of the article.

The thermoplastic polyurethane according to WO 2015/197515 A1 has a melting range (DSC, differential scanning calorimetry; second heating operation at heating rate 5 K/min) of 20 to 170° C. and a Shore A hardness to DIN ISO 7619-1 of 50 to 95, has a melt volume rate (MVR) at a temperature T to ISO 1133 of 5 to 15 cm$^3$/10 min and a change in MVR in the case of an increase in this temperature T by 20° C. of less than 90 cm$^3$/10 min. The end use is the production of articles in powder-based additive manufacturing methods.

WO 2016/198425 A1 discloses a thermally conductive hotmelt adhesive composition comprising a) at least one thermally conductive filler, wherein the thermally conductive filler comprises a mixture of flake particles and first spherical particles in a ratio of 10:1, and wherein the flake particles have an aspect ratio of 1.27:7. Alternatively, the thermally conductive filler contains a mixture of second spherical particles having an average particle size of 35 to 55 μm and third spherical particles having an average particle size of 2 to 15 μm in a ratio of 10:1. The thermally conductive filler is selected from the group consisting of tin oxide, indium oxide, antimony oxide, aluminum oxide, titanium oxide, iron oxide, magnesium oxide, zinc oxide, oxides of rare earth metals, alkali metal and alkaline earth metal sulfates, chalk, boron nitride, alkali metal silicate, silica, iron, copper, aluminum, zinc, gold, silver, tin, alkali metal and alkaline earth metal halides, alkali metal and alkaline earth metal phosphates, and mixtures thereof. In addition, the composition b) comprises at least one (co) polymer selected from polyamide, thermoplastic polyamides, copolyamides, butyl rubber, polybutylene, poly (meth)acrylates, polystyrene, polyurethanes, thermoplastic polyurethane, polyesters, ethylene copolymers, ethylene-vinyl copolymers, SB rubber, SEBS rubber, SI rubber, SIS rubber, SBS rubber, SIB rubber, SIBS rubber, polylactide, silicones, epoxies, polyols and mixtures thereof. According to a use claim, the material is also to be usable as filament for 3D printing.

DE 10 2012 020000 A1 relates to a multistage 3D printing method and to a device usable for this method. This patent application states that, after the process step referred to as unpacking, the shaped articles are sent to the final consolidation step. Subsequently, the shaped articles are sent to further subsequent processes. This process step is preferably executed as a heat treatment step. Parts made of Croning sand that have been produced by the process can serve as an example here. After unpacking, these are preferably embedded again into a further particulate material. However, this does not have any binder coating and preferably has good thermal conductivity. Thereafter, the parts are heat-treated in an oven above the melting temperature of the binder. The specific phenolic resin of the coating in one of the preferred embodiments is crosslinked and there is a significant rise in strength. In general, hotmelt adhesives are preferred for this process step of final consolidation. Base polymers used may preferably be: PA (polyamides), PE (polyethylene), APAO (amorphous polyalphaolefins), EVAC (ethylene-vinyl acetate copolymers), TPE-E (polyester elastomers), TPE-U (polyurethane elastomers), TPE-A (copolyamide elastomers) and vinylpyrrolidone/vinyl acetate copolymers. Further customary additions known to those skilled in the art, such as nucleating agents, may be added.

SUMMARY

It is an object of the present invention to at least partially eliminate the disadvantages in the prior art. More particularly, the problem addressed was that of specifying a novel processing method for hotmelt adhesives, especially having low thermal stability.

This object is achieved by a method as claimed in claim 1. Advantageous embodiments can be found in the dependent claims. Unless clearly otherwise apparent from the context, they can be combined in any desired manner.

BRIEF DESCRIPTION OF THE DRAWINGS

Various features and characteristics of the inventions described in this specification may be better understood by reference to the accompanying figures, in which:

FIG. 1 is a diagram showing storage modulus for products during and after cooling from 100° C. to 20° C.

DETAILED DESCRIPTION

What is proposed in accordance with the invention is a method of applying a material comprising a fusible polymer, comprising the step of:
applying a filament of the at least partly molten material from a discharge opening of a discharge element to a substrate.

The fusible polymer has the following properties:

a melting point (DSC, differential scanning calorimetry; 2nd heating at heating rate 5° C./min) within a range from ≥40° C. to ≤120° C.;

a glass transition temperature (DMA, dynamic-mechanical analysis to DIN EN ISO 6721-1:2011) within a range from ≥−70° C. to ≤30° C.;

a storage modulus G' (plate/plate oscillation viscometer to ISO 6721-10:2015 at a frequency of 1/s) at 20° C. above the melting point of ≥1·10$^4$ Pa, preferably ≥3·10$^4$ Pa, more preferably ≥7·10$^4$ Pa;

a storage modulus G' (plate/plate oscillation viscometer to ISO 6721-10:2015 at a frequency of 1/s) at 10° C. below the melting point with prior heating to a temperature of 20° C. above the melting point and subsequent cooling at a cooling rate of 1° C./min of ≤1·10$^7$ Pa, preferably ≤5·10$^6$ Pa, more preferably ≤1·10$^6$ Pa;

wherein the filament, during the application process, has an application temperature of ≥100° C. (preferably ≥150° C., more preferably ≥200° C.) above the melting point of the fusible polymer for ≤5 minutes (preferably ≤2.5 minutes, more preferably ≤1 minute, especially preferably ≤30 seconds) and wherein the fusible polymer also has the property that the storage modulus G' (plate/plate oscillation viscometer to ISO 6721-10:2015 at a frequency of 1/s) of the fusible polymer at the highest application temperature attained during the application process is smaller by a factor of ≥10 (preferably ≥30, most preferably ≥100) than the storage modulus G' (plate/plate oscillation viscometer to ISO 6721-10:2015 at a frequency of 1/s) at a temperature of 20° above the melting point of the fusible polymer.

The substrate to which the filament is applied may be a flat or curved surface or else the last layer applied within a 3D printing method.

The fusible polymer, which is generally a semicrystalline polymer, without wishing to impose any restriction, can be described as a hotmelt adhesive. It has been found that, surprisingly, such hotmelts can be processed briefly at temperatures well above their melting temperature and their decomposition temperature without occurrence of significant losses in their desired properties. The decomposition temperature is understood here to mean a temperature at which a polymeric material, within a period of ≤1 hour, more than doubles its storage modulus G' (DMA, dynamic-mechanical analysis to DIN EN ISO 6721-1:2011 at a frequency of 1/s, especially plate/plate oscillation viscometer to ISO 6721-10:2015 at a frequency of 1/s), or else the storage modulus G' falls to a value of less than half, preferably less than 30%, more preferably less than 10% and most preferably less than 5% of the starting value.

The discharge opening of a discharge element is preferably a nozzle.

Particularly suitable devices for the applying of the material comprising a fusible polymer have been found to be printheads that work by the principle of an FDM 3D printer. This typically involves conveying a pre-extruded strand of a thermoplastic material (solid filament) through a short heating zone in order to be extruded at the end of the heating zone through a nozzle with a smaller cross-sectional area than the cross-sectional area of the solid filament conveyed. During the extrusion, the printhead can be moved freely in space in XYZ direction, but is typically at a constant distance above a substrate surface, the distance from the substrate surface usually being smaller than the average nozzle diameter, such that the extrudate is deformed under pressure on deposition onto the substrate. The movement speed of the printhead is typically greater than the extrusion speed of the extrudate from the nozzle, as a result of which it undergoes additional tensile deformation. In FDM methods for production of additively manufactured components, movement speeds of 20-100 mm/s are typically chosen. Better results are typically achieved with low movement speeds.

In the method according to the invention, by contrast, it is advantageous to establish movement speeds (application rates) of more than 100 mm/s. The application layer thickness and the application layer width are controllable via the ratio of discharge rate of the material from a discharge nozzle, nozzle geometry, material pressure, movement speed of the nozzle and distance of the nozzle from the substrate surface. If the discharge rate from the nozzle is lower than the movement speed and the nozzle distance from the substrate is lower than the nozzle diameter, the result is coatings with an application layer thickness lower than the nozzle diameter. When the nozzle distance from the substrate is greater than the nozzle diameter and the movement speed is not equal to the discharge rate, there is no continuous and uniform layer deposition, and therefore this embodiment is not preferred.

If the viscosity of a hotmelt of the invention at the nozzle exit is too high, the discharge rate is limited by the pressure buildup in the printhead and the maximum conveying output. Moreover, a high pressure at the nozzle head, owing to a high hotmelt viscosity, typically causes distinct die swell up to and including periodically pulsating die swell at the nozzle exit.

The maximum movement speed at which there is continuous layer deposition with a layer thickness diameter less than the nozzle diameter is therefore a good guide value for a stable process state. The movement speed is still the preferred adjustment parameter for an FDM printer from which the desired discharge rate is calculated in the printing program at a given layer distance and nozzle geometry, and the material conveying rate is established correspondingly.

Using the movement speed of a printhead with a 0.4 mm round nozzle and assuming a substrate distance of 0.2 mm, it is also possible to calculate the dwell time in the heated part of the printhead with a volume of, for example, about 200 mm$^3$.

The method of the invention is particularly suitable for the processing of high molecular weight hotmelt adhesives, also called hotmelts, that have a molecular weight $M_w$ by GPC in DMF/LiBr (1%) against polystyrene standards and after universal calibration by means of a viscosity detector of >30 000, preferably >50 000, more preferably >80 000, most preferably >100 000 g/mol, and/or a storage modulus G' (plate/plate oscillation viscometer to ISO 6721-10:2015 at a frequency of 1/s) at 20° C. above the melting point of ≥1·10$^4$ Pa, preferably ≥5·10$^4$ Pa, more preferably ≥1·10$^5$ Pa and most preferably ≥5·10$^5$ Pa.

Particularly suitable hotmelt adhesives, especially hotmelts, for use in the method according to the invention have the further feature of slow crystallization below the melting temperature. This enables long open times of the adhesive at temperatures below the melting temperature, as opposed to conventional hotmelts that are preferably joined hot, i.e. at temperatures around the melting point.

In a particularly preferred embodiment, in the method of the invention, hotmelt adhesives, especially hotmelts, having a long open time of ≥1 min, preferably ≥3 min, more preferably ≥5 min and especially preferably ≥10 min at a temperature of 10° C. below the melting point, preferably a temperature of 20° C. below the melting point, more preferably a temperature of 30° C. below the melting point, of the hotmelt adhesive are used. Especially preferred hotmelt adhesives are those that have an open time within a range from 10 to 30 minutes at a temperature of 10° C. below the melting point of the hotmelt adhesive.

According to the invention, "open time" of the adhesive is understood to mean the time until the viscosity increases by 500%, based on the starting viscosity of the adhesive at a temperature of 20° C. above the melting point at a cooling rate of 4° C./min. The determination of the viscosity was determined by viscometry measurement in the melt with a plate/plate oscillation viscometer to ISO 6721-10:2015 at 20° C. above the melting temperature and a frequency of 1/s. Since the increase in viscosity is caused by recrystallization, this rise in viscosity on onset of crystallization is typically very marked and allows good reproducibility of determination of the open time.

In a further particularly preferred embodiment, these hotmelts, after rapid cooling by application to a substrate having a temperature of ≤30° C. and ≥10° C., directly after cooling to the substrate temperature, have a storage modulus G' (plate/plate oscillation viscometer to ISO 6721-10:2015 at a frequency of 1/s) of ≥1·10$^5$ Pa, preferably ≥2·10$^5$ Pa, more preferably ≥3·10$^5$ Pa and most preferably ≥4·10$^5$ Pa and ≤5·10$^7$ Pa, preferably ≤1·10$^7$ Pa and more preferably ≤5·10$^6$ Pa.

The individual extrudate filaments as formed at the nozzle exit, for example, may assume a wide variety of different shapes depending on the nozzle geometry. Preference is given to using rotationally symmetric, box-shaped or slot-shaped nozzle geometries that enable the application of coating strips with a coating thickness of ≥20 µm to ≤5 mm, preferably ≥50 µm to ≤2 mm, more preferably 80 µm to ≤1 mm and most preferably 80 µm to ≤0.5 mm. Preferably, the coating width is within a range from ≥20 µm to ≤2000 mm, further preferably from ≥50 µm to ≤100 mm, more preferably from ≥80 µm to ≤10 mm and most preferably from ≥80 µm to ≤5 mm.

In a preferred embodiment, the temperature of the extrudate at the nozzle head is ≥200° C., preferably ≥230° C. and most preferably ≥250° C. The hotmelts are preferably dried before use in the method according to the invention and have a water content of <3% by weight, preferably <1% by weight and more preferably <0.5% by weight and most preferably <0.1% by weight.

In a preferred embodiment, the hotmelt in the method of the invention experiences a heat integral, defined as the area of the high-temperature dwell time above the melting temperature of the hotmelt after feeding into the extruder and prior to application to the substrate, of ≤1000° C.·min, preferably ≤500° C.·min, preferably ≤200° C.·min and most preferably ≤100° C.·min and ≥2° C.·min, preferably ≥5° C.·min and more preferably ≥10° C.·min. The heat integral is calculated by way of example for a dwell time of 5 min at 200° C. above the melting temperature as 200° C.·5 min=1000° C.·min.

The heat integral is preferably within a range from ≤1000° C.·min to ≥10° C.·min, further preferably from ≤500° C.·min to ≥5° C.·min, more preferably from ≤200° C.·min to ≥2° C.·min.

In a further preferred embodiment, on application of the hotmelt to the substrate by the method of the invention, a pressure on the substrate of ≥0.1 bar, preferably ≥0.5 bar, more preferably ≥0.8 bar and most preferably ≥1 bar, and ≤50 bar, preferably ≤20 bar, more preferably ≤10 bar, is built up. The pressure under consideration here is the sum total of the pressure that arises as a result of the conveying of the hotmelt and the pressure that the discharge opening together with the discharge element exerts on the substrate, for example by spring load or pneumatic or hydraulic backpressure.

As well as the fusible polymer, the material may comprise further additives such as fillers, pigments, adhesion improvers, levelling auxiliaries, defoamers, oxidation and hydrolysis stabilizers and the like, but also further polymers. The total content of additives in the material may, for example, be ≥0.1% by weight to ≤100% by weight, preferably ≥0.3% by weight to ≤50% by weight, more preferably ≥0.5% by weight to ≤20% by weight.

The fusible polymer may, after heating to a temperature of 20° C. above the melting point and cooling to 20° C. at a cooling rate of 4° C./min, within a temperature interval from 25° C. to 40° C. for ≥1 minute (preferably ≥1 minute to ≤100 minutes, more preferably ≥3 minutes to ≤80 minutes, even more preferably ≥5 minutes to ≤60 minutes), have a storage modulus G' (determined at the respective temperature with a plate/plate oscillation viscometer according to ISO 6721-10:2015 at a frequency of 1/s) of ≥1·10$^5$ Pa, preferably ≥2·10$^5$ Pa, more preferably ≥3·10$^5$ Pa and most preferably ≥4·10$^5$ Pa to ≤10 MPa, preferably ≤5 MPa and more preferably ≤1 MPa and, after cooling to 20° C. and storage at 20° C. for 120 minutes, have a storage modulus G' (determined at 20° C. with a plate/plate oscillation viscometer according to ISO 6721-10:2015 at a frequency of 1/s) of ≥20 MPa (preferably ≥50, more preferably ≥100 MPa).

The fusible polymer may also have a magnitude of the complex viscosity |η*| (determined by viscometry measurement in the melt with a plate/plate oscillation viscometer according to ISO 6721-10:2015 at 20° C. above the melting temperature and a frequency of 1/s) of ≥100 Pas to ≤5 000 000 Pas. Preferably, |η*| under these measurement conditions is ≥500 Pas to ≤1 000 000 Pas, more preferably ≥1000 Pas to ≤500 000 Pas. Most preferably, |η*| under these measurement conditions is ≥5000 Pas to ≤100 000 Pas.

The magnitude of the complex viscosity |η*| describes the ratio of the viscoelastic moduli G' (storage modulus) and G" (loss modulus) to the excitation frequency ω in a dynamic-mechanical material analysis:

$$|\eta^*| = \sqrt{\left[\left(\frac{G'}{\omega}\right)^2 + \left(\frac{G''}{\omega}\right)^2\right]} = \frac{|G^*|}{\omega}$$

Given the complex viscosities within the range specified in accordance with the invention, it can be assumed that, in the case of prolonged storage at room temperature, only a technically insignificant level of tackiness, if any, will occur in the fusible polymer used.

In a further preferred embodiment, the filament is applied at a rate of ≥150 mm/s. This is also referred to as application rate or movement speed. This is understood to mean the relative speed of discharge opening and substrate. The application rate is preferably ≥200 mm/s.

In a further preferred embodiment, the fusible polymer has a melt viscosity (plate/plate oscillation viscometer to ISO 6721-10:2015 at a frequency of 1/s) at a temperature of 20° C. above the melting point $T_m$ of ≥1000 Pas to ≤500 000 Pas.

In a further preferred embodiment, the fusible polymer is selected such that, after storage at the maximum application temperature attained for a duration of ≤1 hour (preferably ≤30 minutes, more preferably ≤5 minutes, especially preferably ≤1 minute), the storage modulus G' (DMA, dynamic-mechanical analysis to DIN EN ISO 6721-1:2011 at a frequency of 1/s, especially with a plate/plate oscillation viscometer to ISO 6721-10:2015 at a frequency of 1/s) more than doubles, or else the storage modulus G' (especially with a plate/plate oscillation viscometer to ISO 6721-10:2015 at a frequency of 1/s) falls to a value of less than half the starting value. The decrease in G' is the preferred selection criterion. It has been found that the polymers for use with preference in accordance with the invention show only low gel formation, if any, whenever they unavoidably thermally decompose. In that case, there is a reduction in the risk of blockage of a discharge nozzle.

In a further preferred embodiment, prior to the application of the material, the material is heated from a temperature of ≤40° C., preferably ≤30° C., to the maximum application temperature within ≤5 minutes (preferably ≤2 minutes, more preferably ≤1 minute).

In a further preferred embodiment, the material is heated within the discharge element to the envisaged maximal application temperature such that the viscosity of the material at this temperature experiences a decrease at least by a factor of 10 (preferably at least by a factor of 12, further preferably at least by a factor of 15). The reduction in the viscosity by a factor of at least 10 or 12 or 15 shall be understood as that compared to the viscosity at 20° C. above the melting point of the material, measured with a plate/plate oscillation viscometer to ISO 6721-10:2015 at a frequency of 1/s.

In a further preferred embodiment, the material is heated within the discharge element to the envisaged maximum application temperature, such that the viscosity of the material at this temperature, compared to the viscosity at 20° C. above the melting point, experiences a decrease by at least a factor of 20, preferably by at least a factor of 50, further preferably by at least a factor of 100, measured with a plate/plate oscillation viscometer to ISO 6721-10:2015 at a frequency of 1/s.

In a further preferred embodiment, the distance between the surface of the substrate and the discharge opening of the discharge element is ≤1 mm. Preference is given to a distance of ≤0.5 mm, more preferably ≤0.1 mm. In a further preferred embodiment of the method according to the invention, the nozzle is contacted directly with the substrate or has a negative distance from the substrate. This embodiment is particularly advantageous when the substrate is flexible and can yield to the nozzle and the pressure of the extruded hotmelt. In this particular embodiment, the discharge pressure of the hotmelt from the nozzle exceeds the compression modulus of the substrate. This embodiment is particularly advantageous in the coating of fabrics, scrims, foams, soft elastic and porous materials since particularly good contact can be generated here.

The discharge element with its discharge opening can be run over the substrate in contact with the substrate with a constant pressure. The pressure may be adjusted, for example, via a spring element, a hydraulic element or a pressure transducer. What is advantageous in this method, particularly in combination with any negative distance of the discharge nozzle from the substrate, is that any unevenness or surface roughness on the substrate can be compensated for by the constant pressure mode without having to continuously change the programming of the pressure application.

Alternatively or additionally, the distance of the nozzle from the substrate can be measured continuously by a continuous distance measurement, for example by means of laser measurement, and readjusted continuously.

In a further preferred embodiment, the material is applied to the substrate at a pressure of ≥0.5 bar, preferably ≥1 bar, more preferably ≥1.5 bar.

In a further preferred embodiment, the fusible polymer is selected from the group consisting of: polyurethane, polyester, polyalkylene oxide, plasticized PVC, polyamide, polyvinyl acetate, polyethylene, polypropylene, protein or a combination of at least two of these.

Preferably, the fusible polymer is a polyurethane at least partly obtainable from the reaction of aromatic and/or aliphatic polyisocyanates with suitable (poly)alcohols and/or (poly)amines or blends thereof. Preferably, at least a proportion of the (poly)alcohols used comprises those from the group consisting of: linear polyesterpolyols, polyetherpolyols, polycarbonatepolyols, polyacrylatepolyols or a combination of at least two of these. In a preferred embodiment, these (poly)alcohols or (poly)amines bear terminal alcohol and/or amine functionalities. In a further preferred embodiment, the (poly)alcohols and/or (poly)amines have a molecular weight of 52 to 10 000 g/mol. Preferably, these (poly)alcohols or (poly)amines as feedstocks have a melting point in the range from 5 to 150° C. Preferred polyisocyanates that can be used at least partly for preparation of the fusible polyurethanes are selected from the group comprising: TDI, MDI, HDI, PDI, H12MDI, IPDI, TODI, XDI, NDI, decane diisocyanate or a combination of at least two of these. Particularly preferred polyisocyanates are HDI, PDI, H12MDI, MDI and TDI.

In a further preferred embodiment, the fusible polymer comprises a polyurethane obtainable from the reaction of a polyisocyanate component and a polyol component, said polyol component comprising a polyesterpolyol having a no-flow point (ASTM D5985) of ≥25° C.

If appropriate, in the reaction to give the polyurethane, it is also possible to use diols from the molecular weight range of ≥62 to ≤600 g/mol as chain extenders.

The polyisocyanate component may comprise a symmetric polyisocyanate and/or a nonsymmetric polyisocyanate. Examples of symmetric polyisocyanates are 4,4'-MDI and HDI.

In the case of nonsymmetric polyisocyanates, the steric environment of one NCO group in the molecule is different from the steric environment of a further NCO group. In that case, one isocyanate group reacts more quickly with groups reactive toward isocyanates, for example OH groups, while the remaining isocyanate group is less reactive. One consequence of the nonsymmetric structure of the polyisocyanate is that the polyurethanes formed with these polyisocyanates also have a less linear structure.

Examples of suitable nonsymmetric polyisocyanates are selected from the group consisting of: 2,2,4-trimethylhexamethylene diisocyanate, ethylethylene diisocyanate, nonsymmetric isomers of dicyclohexylmethane diisocyanate asymmetric isomers of 1,4-diisocyanatocyclohexane, asymmetric isomers of 1,3-diisocyanatocyclohexane, asymmetric isomers of 1,2-diisocyanatocyclohexane, asymmetric isomers of 1,3-diisocyanatocyclopentane, asymmetric isomers of 1,2-diisocyanatocyclopentane, asymmetric isomers of 1,2-diisocyanatocyclobutane, 1-isocyanatomethyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-diisocyanato-2,4,4-trimethylhexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3- isocyanatoprop-1-yl)cyclohexane, 1-isocyanato-2-(2-isocyanatoeth-1-yl)cyclohexane, 2-heptyl-3,4-bis(9-isocyanatononyl)-1-pentylcyclohexane, norbornane diisocyanatomethyl, diphenylmethane 2,4'-diisocyanate (MDI), tolylene 2,4- and 2,6-diisocyanate (TDI), derivatives of the diisocyanates listed, especially dimerized or trimerized types, or a combination of at least two of these.

Preference is given to 4,4'-MDI or a mixture comprising IPDI and HDI as polyisocyanate component.

The polyol component includes a polyesterpolyol having a no-flow point (ASTM D5985) of ≥25° C., preferably ≥35° C., more preferably ≥35° C. to ≤55° C. To determine the no-flow point, a test vessel containing the sample is set in slow rotation (0.1 rpm). A flexibly mounted measurement head dips into the sample and, on attainment of the no-flow point, moves away from its position as a result of the abrupt increase in viscosity; the resulting tilting motion triggers a sensor.

Without being restricted to a theory, it is assumed that polyurethanes based on the above-discussed nonsymmetric polyisocyanates and polyesterpolyols having the no-flow points specified have such a construction that the groups that originate from the polyisocyanates in the polymer constitute soft segments, and the groups that originate from the polyesterpolyols in the polymer constitute hard segments.

Examples of polyesterpolyols which can have such a no-flow point are reaction products of phthalic acid, phthalic anhydride or symmetric $\alpha,\omega$-$C_4$- to $C_{10}$-dicarboxylic acids with one or more $C_2$- to $C_{10}$-diols. They preferably have a number-average molecular weight $M_n$ of ≥400 g/mol to ≤6000 g/mol. Suitable diols are especially monoethylene glycol, butane-1,4-diol, hexane-1,6-diol and neopentyl glycol.

Preferred polyesterpolyols are specified hereinafter, stating their acid and diol components: adipic acid+monoethylene glycol; adipic acid+monoethylene glycol+1,4-butanediol; adipic acid+1,4-butanediol; adipic acid+1,6-hexanediol+neopentyl glycol; adipic acid+1,6-hexanediol; adipic acid+1,4-butanediol+1,6-hexanediol; phthalic acid (anhydride)+monoethylene glycol+trimethylolpropane; phthalic acid(anhydride)+monoethylene glycol, polycaprolactones. Preferred polyurethanes are obtained from a mixture comprising IPDI and HDI as polyisocyanate component and a polyol component comprising an aforementioned preferred polyesterpolyol. Particular preference is given to the combination of a mixture comprising IPDI and HDI as polyisocyanate component with a polyesterpolyol formed from adipic acid+1,4-butanediol+1,6-hexanediol for formation of the polyurethanes.

It is further preferable that the polyesterpolyols have an OH number (DIN 53240) of ≥25 to ≤170 mg KOH/g and/or a viscosity (75° C., DIN 51550) of ≥50 to ≤5000 mPas.

One example is a polyurethane obtainable from the reaction of a polyisocyanate component and a polyol component, where the polyisocyanate component comprises an HDI and IPDI and where the polyol component comprises a polyesterpolyol which is obtainable from the reaction of a reaction mixture comprising adipic acid and also hexane-1,6-diol and butane-1,4-diol with a molar ratio of these diols of ≥1:4 to ≤4:1 and which has a number-average molecular weight $M_n$ (GPC, against polystyrene standards) of ≥4000 g/mol to ≤6000 g/mol. Such a polyurethane may have a magnitude of the complex viscosity 10 (determined by viscometry measurement in the melt with a plate/plate oscillation viscometer according to ISO 6721-10:2015 at 100° C. and a frequency of 1/s) of ≥2000 Pas to ≤500 000 Pas.

A further example of a suitable polyurethane is:
1. Substantially linear polyester polyurethanes having terminal hydroxyl groups as described in EP 0192946 A1, prepared by reaction of
   a) polyester diols of molecular weight above 600 and optionally
   b) diols from the molecular weight range from 62 to 600 g/mol as chain extenders with
   c) aliphatic diisocyanates,
   observing an equivalents ratio of hydroxyl groups of components a) and b) to isocyanate groups of component c) of 1:0.9 to 1:0.999, where component a) consists to an extent of at least 80% by weight of polyester diols from the molecular weight range of 4000 to 6000 based on (i) adipic acid and (ii) mixtures of 1,4-dihydroxybutane and 1,6-dihydroxyhexane in a molar ratio of the diols of 4:1 to 1:4.

In the polyester polyurethanes recited under 1. it is preferable when component a) consists to an extent of 100% of a polyester diol in the molecular weight range of 4000 to 6000 wherein the production thereof has employed as the diol mixture a mixture of 1,4-dihydroxybutane and 1,6-dihydroxyhexane in a molar ratio of 7:3 to 1:2.

In the polyester polyurethanes mentioned under 1, it is also preferable that component c) comprises IPDI and also HDI.

In the polyester polyurethanes mentioned under 1, it is also preferable that the preparation thereof involved also using, as component b), alkanediols selected from the group consisting of: 1,2-dihydroxy ethane, 1,3-dihydroxypropane, 1,4-dihydroxybutane, 1,5-dihydroxypentane, 1,6-dihydroxyhexane or a combination of at least two of these, in an amount of up to 200 hydroxyl equivalent percent, based on component a).

In a further preferred embodiment of the method of the invention, the fusible polymer, after heating to 20° C. above its melting point and cooling to 20° C. at a cooling rate of 4° C./min, within a temperature interval from 25° C. to 40° C. for ≥1 minute (preferably ≥1 minute to ≤100 minutes, more preferably ≥5 minutes to ≤60 minutes), has a storage modulus G' (determined at the respective temperature with a plate/plate oscillation viscometer according to ISO 6721-10:2015 at a frequency of 1/s) of ≥100 kPa to ≤10 MPa and, after cooling to 20° C. and storage at 20° C. for 120 minutes, has a storage modulus G' (determined at 20° C. with a plate/plate oscillation viscometer according to ISO 6721-10:2015 at a frequency of 1/s) of ≥20 MPa (preferably ≥50 MPa, preferably ≥100 MPa).

In a further preferred embodiment, the material applied is contacted with a second substrate. An adhesive bond can thus be formed. The bonding is preferably effected under pressure until the polymer has cooled down to room temperature. The contacting is preferably effected under a pressure of ≥0.1 bar and ≤100 bar, preferably ≥0.5 bar and ≤20 bar, more preferably ≥1 bar.

In a further preferred embodiment, the second substrate includes a hotmelt adhesive and this is contacted with the material applied. Preferably, this hotmelt adhesive is the same material as already used in the method according to the invention or at least also comprises the fusible polymer used in the method according to the invention. The contacting is preferably effected under a pressure of ≥0.1 bar and ≤100 bar, preferably ≥0.5 bar and ≤20 bar, more preferably ≥1 bar and ≤10 bar. It is also preferable that the temperature of the hotmelt adhesive of the second substrate is ≤10° C., preferably ≤20° C., more preferably ≤30° C., below the melting temperature of this adhesive. It is further preferable that the contacting is effected at a temperature of ≤40° C. or ≤30° C.

In a further preferred embodiment, the material is heated to the maximum application temperature within the nozzle, the material is introduced into the nozzle at an input rate and discharged from the nozzle at a discharge rate, and the discharge rate is greater than the input rate. The discharge rate may, for example, be 3 times, 4 times or up to 10 times greater than the input rate. The specific rate ratios depend on the diameter of a filament of the material introduced into the nozzle and on the filament geometry of the material discharged.

In a further preferred embodiment, the at least partly molten material is subjected to a pressure of ≥0.5 MPa within the nozzle. The pressure may also be ≥1 MPa or ≥5 MPa.

In a further preferred embodiment, the nozzle is moved sufficiently close to the substrate that the material pressure in the nozzle rises above the calculated theoretical pressure since the distance of the nozzle from the substrate is less than the average diameter of the nozzle. The pressure may also be ≥1 MPa or ≥2 MPa.

In a further preferred embodiment, the method is a method of producing an article from the material and the method comprises the steps of:
I) applying a filament of the at least partly molten material to a carrier so as to obtain a layer of the material, corresponding to a first selected cross section of the article;
II) applying a filament of the at least partly molten material to a previously applied layer of the material so as to obtain a further layer of the material, corresponding to a further selected cross section of the article and bonded to the layer applied beforehand;
III) repeating step II) until the article has been formed.

In this embodiment, an article is constructed layer by layer. The process is accordingly a fused deposition modeling (FDM) process. If the number of repetitions for the applying is sufficiently low, it is also possible to make reference to a two-dimensional article which is to be constructed. Such a two-dimensional article can also be characterized as a coating. For construction thereof, ≥2 to ≤20 repetitions may be conducted for application, for example.

An electronic model of the article to be formed is advantageously held in a CAD program. The CAD program can then calculate cross sections of the model that become cross sections of the article by application of the filament.

Step I) relates to the construction of the first layer on a carrier. Subsequently, step II), in which further layers are applied to previously applied layers of the material, is executed until the desired end result in the form of the article is obtained. The at least partly molten material (also called construction material in the terminology of 3D printing) bonds to existing layers of the material in order to form a structure in z direction.

In a further preferred embodiment, the substrate is a textile, a foil, a paper, a cardboard, a foam, a mold component, part of a shoe, a circuit board for electronic circuits, an electronics housing part or an electronic component.

The invention is illustrated in detail hereinafter by the examples which follow, but without being restricted thereto.
Test Methods:
The methods detailed hereinafter for determination of the appropriate parameters were used for performance and evaluation of the examples and are also the methods for determination of the parameters of relevance in accordance with the invention in general.

The ambient temperature of 23° C. at the time of conducting the experiments is referred to as RT (room temperature).

All percentages are based on weight, unless stated otherwise.

Unless stated otherwise, the reported viscosity was determined with a plate/plate oscillation viscometer to ISO 6721-10:2015 at a frequency of 1/s.

The glass transition temperature $T_g$ and melting temperatures $T_m$ were determined by means of DSC (differential scanning calorimetry) with a Mettler DSC 12E calorimeter (Mettler Toledo GmbH, Giessen, DE). For this purpose, about 10 mg of substance were weighed into aluminum crucibles with a lid (standard capsules) and the crucible was sealed tight. The crucible was inserted into the measurement cell of the calorimeter at RT (23° C.) and frozen to −100° C. After adjustment of the temperature equilibrium, the samples were heated from −100° C. to +150° C. in the course of three successive heating operations with the heating rate of 20 K/min and frozen again at a cooling rate of 320 K/min. To evaluate the glass transition point and melting point, the third heating curve was utilized in each case.
Starting Materials:
The hotmelt filaments were produced using high molecular weight adhesive raw materials from Covestro Deutschland AG. Products from the Dispercoll® U product series were used; these are dispersions of anionic, high molecular weight polyurethane in water for production of adhesives, for example for the footwear, furniture, automotive and construction industries.

Further hotmelt filaments were produced on the basis of products from the Desmocoll® product series; these are conventional adhesive raw materials that find use as solventborne adhesives for production of adhesives, for example for the footwear, furniture, automotive and construction industries.

Further hotmelt filaments were produced on the basis of the Desmomelt® product series; these are hotmelt adhesives that have preferably been processed hot and under pressure as solventborne adhesives or as powder adhesives or film adhesives.

For the production of the filaments based on the anionic adhesive dispersions from the Dispercoll® U series, 1 kg of the form of the dispersion as supplied in each case was frozen at −18° C. in water at −18° C. over a period of 12 h, then thawed at 23° C. over the course of 12 h and filtered through a 100 micrometer filter. The residue was dried in a drying cabinet with extractor suction at 30° C. over the course of 24 h. The result was a white powder in the form of coarse grains. After sieving through a sieve having a mesh size of 5 mm, the powder obtained below the sieve was processed directly in an extruder to form filaments.

For the production of the filaments based on the Desmocoll® series, the raw materials were used as supplied in pellet form directly for processing in the extruder.

For the production of the filaments based on the Desmomelt® series, the raw materials were used as supplied in pallet form directly for processing in the extruder.

The filaments were produced with a Fisher Scientific twin-screw extruder. The instrument consisted of a Rheodrive7 drive unit and a Rheomex PTW 16/40 compounding unit with a twin screw and a nozzle having a diameter of 3 mm. The materials were introduced into the extruder in the form of dried granules at 100 to 700 g/h, melted at a temperature of 80-150° C. and delivered from the nozzle. The screw speed was adjusted to about 10 to 50 rpm in a load-dependent manner. The strand exiting from the nozzle was stretched to a diameter of about 2.85 mm, cooled down by means of a water bath, blown dry with air and wound up in the form of a filament.

Prior to application as a hotmelt in the method of the invention, the filament thus obtained was dried at 30° C. for a further 24 h.

The residual moisture content of all products used is ≤1.5%. The residual moisture content was determined via the decrease in weight after storage in an air circulation oven at 100° C. for 8 h. The materials have an equilibrium moisture content of about 1% when the material is stored or processed under standard conditions (i.e. at room temperature of 23° C., and standard pressure).

All products used were sourced from Covestro Deutschland AG.

Dispercoll® U 54: Dispersion of anionic, high molecular weight polyurethane for production of adhesives, for example for the furniture, automotive, footwear and construction industries.

Dispercoll® U 53: Dispersion of anionic, high molecular weight polyurethane for production of adhesives, for example for the furniture, automotive, footwear and construction industries.

Dispercoll® U 56: Dispersion of anionic, high molecular weight polyurethane for production of adhesives, for example for the furniture, automotive, footwear and construction industries.

Dispercoll® U 58 Dispersion of anionic, high molecular weight polyurethane for production of adhesives, for example for the furniture, automotive, footwear and construction industries.

Dispercoll® U XP 2612 Dispersion of anionic, high molecular weight polyurethane for production of adhesives, for example for the furniture, automotive, footwear and construction industries.

Dispercoll® U XP 2710 Dispersion of anionic, high molecular weight polyurethane for production of adhesives, for example for the furniture, automotive, footwear and construction industries.

Desmocoll® 540/4 Largely linear, elastic hydroxypolyurethane having a very high tendency to crystallize. Excellent adhesion to PVC materials, high initial strength and heat resistance of the bonds.

Desmocoll® 621/2 Largely linear, elastic, highly crystallizing hydroxypolyurethane having low thermoplasticity. Suitable for production of adhesives having long contact bonding time.

Desmomelt® VPKA 8702 Largely linear, flexible, very highly crystallizing hydroxypolyurethane. The ground melt-applied adhesive powder is suitable, for example, for the manufacture of composite structures by means of scatter coating.

Data for noninventive hotmelt adhesives were sourced from publicly available data sheets.

EXPERIMENTS

The printer used was an X400 FDM 3D printer from German RepRap GmbH, equipped with a Volcano Hotend from E3D, with a melt zone of capacity about 209 mm$^3$.

The processing was effected using filaments of diameter about 2.8 mm, under the following method conditions unless described differently: build chamber temperature=23° C., extrusion die diameter: 0. mm.

To measure the material stability in the process, the filaments were each delivered at different nozzle temperature and different volume flow rate for about 10 minutes.

The movement speed [mm/sec] was found as the ratio of the layer thickness and layer width established in the application in correlation with the delivery volume flow rate established through a given exit nozzle. Typical values were a layer thickness of 0.1 mm and a layer width of 0.4 mm in an extrusion nozzle having a diameter of 0.4 mm.

The nozzle temperature was optionally varied within the range of 200° C.-290° C. The viscosity and storage modulus at 100° C. of the extrudate were determined with a plate/plate oscillation viscometer at a frequency of 6.28 rad/s and compared to the starting material for the filament. It was shown here that no significant decrease in molecular weights was observed in the production of the filaments from the dried powders.

It was observed that the hotmelts based on the materials of the invention, by comparison with conventional PU, EVA, PE or copolyamide hotmelts, could be extruded by the method of the invention only at comparatively high temperatures of well above 100° C. above their melting temperature.

High molecular weight hotmelts used in accordance with the invention showed comparatively poor aging characteristics over prolonged periods within the temperature range necessary for extrusion.

Only by means of very short processing times of the preferred extrusion temperatures in the method of the invention was it possible to use these hotmelts without significant loss of molecular weight and hence of bonding properties, particularly for applications with high demands on immediate strength and on long open times.

Inventive experiments are identified by * hereinafter.

Tm (° C.)=melting point from DSC

Tg (° C.)=glass transition point from DSC

G' (Pa)=storage modulus measured in plate/plate rheometer at 6.28 rad/s, 1% amplitude.

η (Pas)=magnitude of complex viscosity measured in a plate/plate oscillation rheometer at 6.28 rad/s, 1% amplitude and a given temperature.

Table 1 describes the softening temperatures and rheology of typical products of the invention; in order to ascertain the viscosities, the material was heated to 100° C. and then cooled down in 4° C./min steps, ascertaining the storage moduli G' (Pa) and viscosities η (Pas) at 100° C. (G"(100) and η(100)), at 69° C. (G'(69) and η(69) and at 49° C. (G'(49) and η(49)):

TABLE 1

| Experiment | Product as filament | Tg [° C.] | Tm [° C.] | G'(100) [Pa] | η(100) [Pas] | G'(69) [Pa] | η(69) [Pas] | G'(49) [Pa] | η(49) [Pas] |
| --- | --- | --- | --- | --- | --- | --- | --- | --- | --- |
| 1* | Dispercoll ® U54 | −55 | 48 | 314000 | 56700 | 538000 | 91300 | 737000 | 122000 |
| 2* | Dispercoll ® U53 | −57 | 48 | 336000 | 59100 | 574000 | 95600 | 766000 | 125000 |
| 3* | Dispercoll ® U56 | −56 | 48 | 77400 | 17800 | 195000 | 37700 | 346000 | 61600 |
| 4* | Dispercoll ® U58 | −57 | 48 | 578000 | 96100 | 798000 | 131000 | 986000 | 160000 |
| 5* | Dispercoll ® U XP 2710 | −56 | 48 | 524000 | 87600 | 749000 | 122000 | 935000 | 151000 |
| 6* | Dispercoll ® U XP 2612 | −56 | 48 | 308000 | 54600 | 521000 | 87900 | 745000 | 122000 |

TABLE 1-continued

| Experiment | Product as filament | Tg [° C.] | Tm [° C.] | G'(100) [Pa] | η(100) [Pas] | G'(69) [Pa] | η(69) [Pas] | G'(49) [Pa] | η(49) [Pas] |
|---|---|---|---|---|---|---|---|---|---|
| 7* | Desmocoll ® 540/4 | −47 | 48 | 194000 | 40500 | 384000 | 71600 | 596000 | 103000 |
| 8* | Desmocoll ® 621/2 | −47 | 48 | 243000 | 50000 | 471000 | 86500 | 722000 | 124000 |
| 9* | Desmomelt ® VPKA 8702 | −47 | 48 | 21400 | 9170 | 83000 | 23700 | 216000 | 47200 |

Table 2 contains values for the change in viscosity of the materials of the invention against temperature up to the processing temperatures of the invention. Prior to the measurements conducted, the samples were dried in each case in a drying cabinet at 35° C. for 4 h (for the samples that were examined at 80° C. to 140° C.) or 72 h (for the samples that were examined at 140° C. to 200° C. and 200° C. to 290° C.), and then pressed at 80° C. with a laboratory press to give specimens.

The measurements were conducted with an ARES rheometer, from Rheometrics, PP25 mm system (to DIN 53019), at 1 Hz (w=6.28 1/s) under a nitrogen atmosphere. The heating rate for a first sample was 3 K/min (80° C. to 140° C.), for the second sample 5 K/min (140° C. to 200° C.), and for the third sample 6 K/min (200° C. to 290° C.). The measurement was divided into 3 parts with new samples each time, in order to minimize premature aging effects in the measurement of viscosity.

The data for the noninventive hotmelts were adopted from the manufacturer. The data for the noninventive hotmelts cover the typical range of hotmelt materials, for example processing viscosities of 0.5 to 20 Pas within a temperature range from 120 to 220° combined with a pot life of typically >>1 h at the recommended processing temperatures, in order to assure reliable processing.

Table 3 contains data for the thermal stability of the products of the invention in the method of the invention, with filament extrusion effected by means of a Hotend Volcano from E3D, with a melt zone of about 209 mm³, extrusion nozzle diameter 0.4 mm. The rheological data before and after extrusion were determined in a plate/plate rheometer at 100° C., 6.28 rad/s, 1% amplitude. The actual average temperature of the extrudate, according to the throughput rate and coefficient of heat transfer of the hot end or heat capacity of the product to be extruded, could be inhomogeneous from the outside inward in the extrudate, and lower than the hot end temperature defined in the programming. This had a positive effect if anything on the application properties and stabilities since a higher marginal temperature can lead to a low marginal layer viscosity and a smaller pressure buildup in the extruder, and hence to higher extrusion rates. The filament thickness was about 2.8 mm in each case.

"Before" denotes the results of rheological measurements before the extrusion. "After" denotes the results of rheological measurements after the extrusion.

TABLE 2

| Experiment | Product as filament | Viscosity [Pas] At T [° C.] | | | | | | |
|---|---|---|---|---|---|---|---|---|
| | | 100 | 130 | 160 | 180 | 210 | 250 | 280 |
| 10* | Dispercoll ® U56 | 20500 | 9520 | 3370 | 1520 | 432 | 48.1 | 1.41 |
| 11* | Dispercoll ® U54 | 44600 | 24600 | 11700 | 6330 | 1720 | 33.9 | 2.27 |
| 12* | Dispercoll ® U58 | 65200 | 55800 | 46400 | 37200 | 15400 | 8030 | 3.01 |
| 13 | **Technomelt ® PS 8707 ST: 105-115° C. PT: 150-180° C. | — | — | — | 3.2-4.8 | — | | |
| 14 | **Technomelt ® PA 6238 ST: 133-145° C. PT: 180-220° C. | — | — | 21-33 | 10-16 | — | | |
| 15 | **Technomelt ® PA 657 black ST: 150-165° C. PT: 180-230° C. | — | — | — | | 3.7 | — | |
| 16 | **Technomelt ® AS 5374 ST: 92-104° C. PT: 160-200° C. | — | — | — | 2.3-3 | — | | |
| 17 | **Technomelt ® AS 9268H ST: 82-90° C. PT: 170-190° C. | — | — | 22.5-31.5 | — | — | | |

**The viscosity values for the comparative experiments were taken from publications from the manufacturer (product data sheets from the manufacturer Henkel AG).
The viscosities for the comparative experiments were determined by the manufacturer with a Brookfield viscometer at 160° C. with spindle 27.
The values were reported in mPas and have been converted correspondingly in the table.
ST stands for softening temperature;
PT stands for processing temperature.

TABLE 3

| Experiment | Material | Extruder temperature [° C.] | Delivery volume flow rate of filament [mm/min] | Exit rate of extradate [mm/sec] | G' before [Pa] | G' after [Pa] | Dwell time [sec] | Heat integral [° C. min] |
|---|---|---|---|---|---|---|---|---|
| 18* | Dispercoll ® U53 | 290 | 100 | 82 | 336000 | 82600 | 20 | 81 |
| 19* | Dispercoll ® U56 | 290 | 100 | 82 | 77400 | 25100 | 20 | 81 |
| 20* | Dispercoll ® U 58 | 290 | 100 | 82 | 578000 | 268000 | 20 | 81 |
| 21* | Dispercoll ® UXP 2612 | 290 | 100 | 82 | 308000 | 108000 | 20 | 81 |
| 22* | Desmocoll ® 540/4 | 290 | 100 | 82 | 194000 | 102000 | 20 | 81 |
| 23* | Desmocoll ® 621/2 | 290 | 100 | 82 | 243000 | 137000 | 20 | 81 |
| 24 | Dispercoll ® U 53 | 290 | 5 | 4 | 336000 | 1100 | 390 | 1573 |
| 25 | Dispercoll ® U 56 | 290 | 5 | 4 | 77400 | 1050 | 390 | 1573 |
| 26 | Dispercoll ® U 58 | 290 | 5 | 4 | 578000 | 45400 | 390 | 1573 |
| 27 | Dispercoll ® UXP 2612 | 290 | 5 | 4 | 308000 | 870 | 390 | 1573 |
| 28 | Desmocoll ® 540/4 | 290 | 5 | 4 | 194000 | 2500 | 390 | 1573 |
| 29 | Desmocoll ® 621/2 | 290 | 5 | 4 | 243000 | 10800 | 390 | 1573 |
| 30 | Dispercoll ® U 56 | 210 | 5 | 4 | 77400 | 13900 | 390 | 1053 |
| 31 | Dispercoll ® U 53 | 210 | 5 | 4 | 336000 | 82000 | 390 | 1053 |
| 32 | Dispercoll ® U 58 | 210 | 5 | 4 | 578000 | 176000 | 390 | 1053 |
| 33 | Dispercoll ® UXP 2612 | 210 | 5 | 4 | 308000 | 54400 | 390 | 1053 |

It is found that, as apparent from the figures in table 3, both high extrusion temperatures and long dwell times at relatively high temperatures will lead to a significant decrease in molecular weight (decrease in viscosity/modulus) of the product, and therefore these products are not processible in conventional hotmelt extrusions without severe loss of function, and only the inventive combination of a high application temperature and short dwell time leads to sufficiently stable products and good processability.

Table 4 shows the results of the study of the aging resistance of the filaments in an air circulation oven at 290° C. and 210° C. for various dwell times. The rheological data before and after aging were compared, measured in an oscillating plate/plate rheometer at 100° C., 6.28 rad/s, 1% amplitude. For this purpose, 20 g in each case of filament were introduced into a round aluminum dish of diameter 10 cm in a preheated air circulation oven, and removed again after a defined time. In the air circulation ovens, the oven temperature is distinctly reduced by opening. Moreover, the sample takes a certain time to adopt the oven temperature. Consequently, the effective average temperature in the thermal storage in the case of short residence times is likely to be somewhat lower than the oven temperature specified.

method. Only an application method that combines high temperatures with very short dwell times permits the use of the products of the invention as hotmelts with good wetting, extremely high initial strengths and sometimes excellent open times.

The diagram in FIG. 1 shows the open times and the respective viscosity of the products of the invention after cooling of the melt from 100° C. to 20° C. As shown in the diagram in FIG. 1, the viscosity values at 20° C. have been attained after 20 minutes. As shown in the diagram, for all 6 examples that are also listed in the table (Dispercoll® U54, U56, U58, U XP2612, UXP 2710 and U53), the viscosity values are all within a range of good processability. As likewise indicated in the diagram by the black frame from 0 to 40 minutes on the X axis for time and from 1.0E+4 to 1.0E+07 Pa on they axis for the storage modulus, the range of good processability for the adhesives extends up to a storage modulus G' of 1.0E+07 Pa. For the materials Dispercoll® U53 and U56, the viscosity progression of which is shown by the two curves on the left, this means that they are processible up to about 25 minutes. For the two middle curves corresponding to Dispercoll U 58 and U XP2710, good processability up to about 35 minutes. For the two

TABLE 4

| Experiment | Material | Oven temperature [° C.] | Dwell time [s] | G' before [Pa] | G' after [Pa] | Heat integral [° C. min] |
|---|---|---|---|---|---|---|
| 34 | Dispercoll ® U53 | 290 | 540 | 336000 | 23 | 2178 |
| 35 | Dispercoll ® U56 | 290 | 540 | 77400 | 22 | 2178 |
| 36 | Dispercoll ® U 58 | 290 | 540 | 578000 | 1000 | 2178 |
| 37 | Dispercoll ® UXP 2612 | 290 | 540 | 308000 | 10 | 2178 |
| 38 | Desmocoll ®540/4 | 290 | 540 | 194000 | 16400 | 2178 |
| 39 | Desmocoll ®621/2 | 290 | 540 | 243000 | 6950 | 2178 |
| 40 | Dispercoll ® U 54 | 290 | 540 | 314000 | 46 | 2178 |
| 41 | Dispercoll ® U 2710 | 290 | 540 | 524000 | 9 | 2178 |

The oven measurement shows clearly that the products of the invention do not have adequate thermal stability at the desired method temperatures with a dwell time that is comparatively short for hotmelt applications. The high temperature is required to obtain sufficiently low processing viscosity and hence applicable products that wet suitable surfaces as adhesives. Therefore, the products of the invention cannot be processed as hotmelt by the conventional curves on the right that give the progression of viscosity for Dispercoll® U XP 2612 and U XP 2710, this means that they have good processability for more than 40 minutes.

The measurements shown in table 4 and in the diagram in FIG. 1 were measured in oscillation on a Physica MCR101 instrument at 100° C. to 20° C. at a cooling rate of −4° C./min, at a frequency of 1 Hz, 1% amplitude.

It becomes clear from the cooling curves with falling temperature that the viscosity rises significantly with temperature, but also still remains within a range that permits contact bonding well below the crystallization temperature. What are shown here are thus long open times in which bonding is possible. This clearly sets the materials shown apart from standard hotmelts which, when the temperature goes below the crystallization temperature, typically harden rapidly or alternatively have to be mixed with large amounts of low molecular weight plasticizers, but these then significantly impair the mechanical properties.

Table 5 shows the result of application experiments on the products of the invention by the method of the invention to standard substrates, and the values obtained thereby by comparison with the application of comparable dispersion adhesives from the prior art.

The application method used was an X400 printer from German RepRap GmbH, equipped with a Volcano Hotend from E3D, with a melt zone of about 209 mm³ Processing was effected using filaments of diameter about 2.8 mm under the following process conditions: build chamber temperature=23° C., extrusion nozzle diameter=0.4 mm, hot end temperature 290° C., movement speed set about 250 mm/s (the movement speed always includes braking and acceleration zones at inflection points, and therefore no more precise figure is possible), at a distance from the substrate of 0.1 mm, as a result of which, on application to the substrate, the material of the invention was deformed from the extrusion nozzle and applied to the substrate in a layer thickness of 0.1 mm according to the melt pressure.

The material was applied to a PVC specimen (30% plasticizer) with dimensions of 3 cm*20 cm, coating half of the specimen (10 cm*3 cm) with the material by application in lanes. The specimen thus obtained was bonded in the coated area to a further (optionally coated) specimen under pressure, optionally after thermal activation, and, subsequently, the immediate and final strength were determined after fixed times. The results thus obtained were compared with the results of the application of typical aqueous adhesive formulations based on the products tested. 10 minutes before application of the adhesive, the PVC strip was wiped in each case with ethyl acetate for cleaning/activation of the surface. Aqueous adhesives were coated wet as a 50% dispersion onto the PVC strips with aid of a brush in layer thickness about 0.2 mm. Subsequently, the coated specimen was dried at ambient temperature and 50% humidity for 1 h. The heat activation of the dried adhesive dispersion was effected by irradiation with an IR Flash device from Funk for 10 s; the surface temperature after activation was about 86° C. Immediately after the heat activation, the PVC strips were placed on by the coated side, such that the coated surfaces had maximum overlap. The test specimen was then compressed in a press at 4 bar for 1 minute Immediately after the pressing (within 1 minute), the immediate peel strength test was then determined as a 180° peel test with a peeling speed of 100 mm/min on a Zwick tensile tester. The final strength was likewise determined at a peeling speed of 100 mm/min after 3 days.

| Test: | |
|---|---|
| Peel strength | PVC/PVC, 180° peel test. |
| Sample width | 30 mm |
| Initial force | 0 N |
| Test speed speed | 100 mm/min |
| Adhesive | Dispercoll ® U |
| Substrate 1 | PVC (30% plasticizer) |
| Substrate 2 | PVC (30% plasticizer) |
| IR activation | 10 s, surface temperature after activation about 86° C., |
| Joining conditions | 60 s, 4 bar |

Table 5 summarizes the results of the adhesive test.

TABLE 5

| Experiment | Sample: | Application | Joining conditions | Initial strength [N/mm] | Final strength [N/mm] |
|---|---|---|---|---|---|
| 42* | U54 Hotmelt | X400, 290° C., layer thickness 0.1 mm, movement speed about 250 mm/s | applied to one side, compressed directly after printing (<1 min) | | 4.8 |
| 43* | U58 Hotmelt | X400, 290° C., layer thickness 0.1 mm, movement speed about 250 mm/s | applied to one side, compressed at 4 bar, 60 s, directly after printing (<1 min) | | 8.5 |
| 44* | U58 Hotmelt | X400, 290° C., layer thickness 0.1 mm, movement speed about 250 mm/s | applied to both sides, compressed at 4 bar, 60 s, directly after printing (<1 min) | 10.4 | |
| 45* | U58 Hotmelt | X400, 290° C., layer thickness 0.1 mm, movement speed about 250 mm/s | applied to both sides, compressed by hand, 10 s, directly after printing (<1 min) | | 9.8 |

TABLE 5-continued

| Experiment | Sample: | Application | Joining conditions | Initial strength [N/mm] | Final strength [N/mm] |
|---|---|---|---|---|---|
| 46* | U58 Hotmelt | X400, 290° C., layer thickness 0.1 mm, movement speed about 250 mm/s | applied to one side, compressed by hand, 10 s, directly after printing (<1 min) | 1.1 | |
| 47* | U58 Hotmelt | X400, 290° C., layer thickness 0.1 mm, movement speed about 250 mm/s | applied to one side, compressed at 4 bar, 60 s, directly after printing (<1 min) | 2.6 | |
| 48* | U54 Hotmelt | X400, 290° C., layer thickness 0.1 mm, movement speed about 250 mm/s | applied to both sides, compressed at 4 bar, 60 s, directly after printing (<1 min) | 7.3 | |
| 49* | U54 Hotmelt | X400, 290° C., layer thickness 0.1 mm, movement speed about 250 mm/s | applied to one side, compressed by hand, 10 s, directly after printing (<1 min) | 2.6 | |
| 50* | U54 Hotmelt | X400, 290° C., layer thickness 0.1 mm, movement speed about 250 mm/s | applied to one side, compressed at 4 bar, 60 s, directly after printing (<1 min) | 6.4 | |
| 51* | U58 Hotmelt | X400, 290° C., layer thickness 0.1 mm, movement speed about 250 mm/s | applied to both sides, compressed at 4 bar, 60 s, directly after printing (<1 min) | | 16.3 |
| 52* | U54 Hotmelt | X400, 290° C., layer thickness 0.1 mm, movement speed 250 mm/s | applied to one side, compressed at 4 bar, 60 s, directly after IR heat activation | | 10.5 |
| 53* | U58 Hotmelt | X400, 290° C., layer thickness 0.1 mm, movement speed 250 mm/s | applied to both sides, compressed at 4 bar, 60 s, directly after IR heat activation | | 15.4 |
| 54 | U54 aqueous | Brush, 23° C., layer thickness 0.2 mm wet, drying at 23° C. for 1 h | applied to both sides, compressed at 4 bar, 60 s, directly after IR heat activation | 5.1 | 10.3 |
| 55 | U58 aqueous | Brush, 23° C., layer thickness 0.2 mm wet, drying at 23° C. for 1 h | applied to both sides, compressed at 4 bar, 60 s, directly after IR heat activation | 5.9 | 11.1 |
| 56 | U54 aqueous | Brush, 23° C., layer thickness 0.2 mm wet, drying at 23° C. for 1 h | applied to one side, compressed at 4 bar, 60 s, no IR heat activation | 0.1 | |

TABLE 5-continued

| Experiment | Sample: | Application | Joining conditions | Initial strength [N/mm] | Final strength [N/mm] |
|---|---|---|---|---|---|
| 57 | U58 aqueous | Brush, 23° C., layer thickness 0.2 mm wet, drying at 23° C. for 1 h | applied to one side, compressed at 4 bar, 60 s, no IR heat activation | 0.1 | |

It was found that the inventive application of a high molecular weight hotmelt leads to comparable properties to the conventional application of material-like adhesive dispersions. One advantage of the hotmelt application method of the invention in combination with the hotmelt products of the invention is that a time-consuming and costly process of drying the adhesive can be dispensed with. Moreover, application of adhesive to one side is possible. A further advantage is that, directly after application of the adhesive by the method of the invention, it was possible to undertake successful bonding with high initial strength without further heat activation.

The invention claimed is:

1. A method of applying a material comprising a fusible polymer, comprising:
applying a filament of the fusible polymer comprising an at least partly molten material from a discharge opening of a discharge element to a substrate;
wherein the fusible polymer has the following properties:
a melting point within a range from ≥40° C. to ≤120° C. based on a differential scanning calorimetry 2nd heating at a heating rate of 5° C./min;
a glass transition temperature within a range from ≥−70° C. to ≤30° C. based on dynamic-mechanical analysis according to DIN EN ISO 6721-1:2011;
a storage modulus G' at 20° C. above the melting point of $\geq 1 \cdot 10^4$ Pa based on ISO 6721-10:2015 using a plate/plate oscillation viscometer at a frequency of 1/s;
a storage modulus G' at 10° C. below the melting point with prior heating to a temperature of 20° C. above the melting point and subsequent cooling at a cooling rate of 1° C./min of $\leq 1 \cdot 10^7$ Pa based on ISO 6721-10:2015 using a plate/plate oscillation viscometer at a frequency of 1/s;
wherein the filament is applied at an application temperature of ≥100° C. above the melting point of the fusible polymer for ≤5 minutes,
wherein, at a maximum application temperature attained during melting of the fusible polymer, the fusible polymer has a storage modulus G' that is smaller by a factor of ≥10 than the storage modulus G' at a temperature of 20° C. above the melting point of the fusible polymer based on ISO 6721-10:2015 using a plate/plate oscillation viscometer at a frequency of 1/s, and
wherein the fusible polymer comprises at least one of polyurethane, polyester, or a combination thereof.

2. The method as claimed in claim 1, further comprising applying the filament at a rate of 150 mm/s.

3. The method as claimed in claim 1, wherein the fusible polymer is selected such that, after storage at the maximum application temperature attained for a duration of ≤1 hour, the storage modulus G' more than doubles, or else the storage modulus G' falls to a value of less than half of a starting value based on ISO 6721-10:2015 using a plate/plate oscillation viscometer at a frequency of 1/s.

4. The method as claimed in claim 1, further comprising heating the material from a temperature of ≤40° C. to the maximum application temperature within ≤5 minutes prior to applying the material.

5. The method as claimed in claim 1, further comprising heating the material within the discharge element to the maximum application temperature, such that a viscosity of the material decreases at least by a factor of 10.

6. The method as claimed in claim 1, wherein a distance between a surface of the substrate and the discharge opening of the discharge element is ≤1 mm.

7. The method as claimed in claim 1, further comprising contacting and passing the discharge element with its discharge opening over the substrate at a constant pressure.

8. The method as claimed in claim 1, further comprising applying the material to the substrate at a pressure of ≥0.5 bar.

9. The method as claimed in claim 1, wherein the fusible polymer comprises a polyurethane obtained from a reaction of a polyisocyanate component and a polyol component, wherein the polyol component includes a polyesterpolyol having a no-flow point of ≥25° C. based on ASTM D5985.

10. The method as claimed in claim 1, wherein the fusible polymer, after heating to 20° C. above its melting point and cooling to 20° C. at a cooling rate of 4° C./min, within a temperature interval from 25° C. to 40° C. for ≥1 minute, has a storage modulus G' of ≥100 kPa to ≤10 MPa and, after cooling to 20° C. and storage at 20° C. for 120 minutes, has a storage modulus G' of 20 MPa based on ISO 6721-10:2015 using a plate/plate oscillation viscometer at a frequency of 1/s.

11. The method as claimed in claim 1, further comprising contacting the material with a second substrate after applying the material.

12. The method as claimed in claim 11, wherein the second substrate includes a hotmelt adhesive that contacts the material.

13. The method as claimed in claim 1, wherein the method is a method of producing an article from the material, the method of producing the article from the material comprising:
I) applying the filament of the at least partly molten material to a carrier to obtain a layer of the material, corresponding to a first selected cross section of the article;
II) applying a filament of the at least partly molten material to a previously applied layer of the material to obtain a further layer of the material, corresponding to a further selected cross section of the article and bonded to the layer applied beforehand;
III) repeating II) until the article has been formed.

14. The method as claimed in claim 1, wherein the substrate is a textile, a foil, a paper, a cardboard, a foam, a mold component, part of a shoe, a circuit board for electronic circuits, an electronics housing part, or an electronic component.

15. The method as claimed in claim 1, wherein the fusible polymer comprises an anionic polyurethane.

* * * * *

UNITED STATES PATENT AND TRADEMARK OFFICE
CERTIFICATE OF CORRECTION

| | | |
|---|---|---|
| PATENT NO. | : 12,168,319 B2 | Page 1 of 1 |
| APPLICATION NO. | : 16/965717 | |
| DATED | : December 17, 2024 | |
| INVENTOR(S) | : Achten et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 829 days.

Signed and Sealed this
Twenty-fourth Day of June, 2025

Coke Morgan Stewart
*Acting Director of the United States Patent and Trademark Office*